March 10, 1970     A. K. BEY     3,500,080
OSCILLATING ELECTRIC MOTOR
Filed Sept. 18, 1967
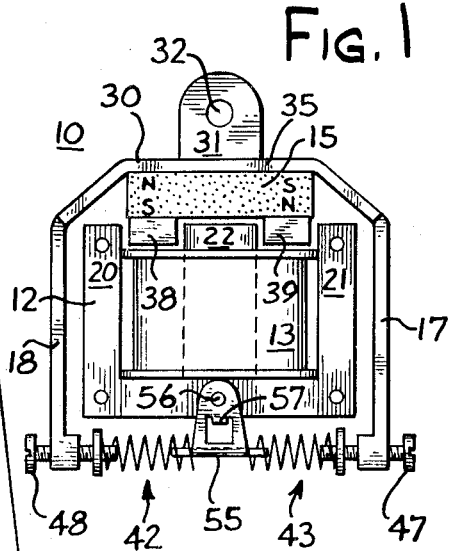
Fig. 1
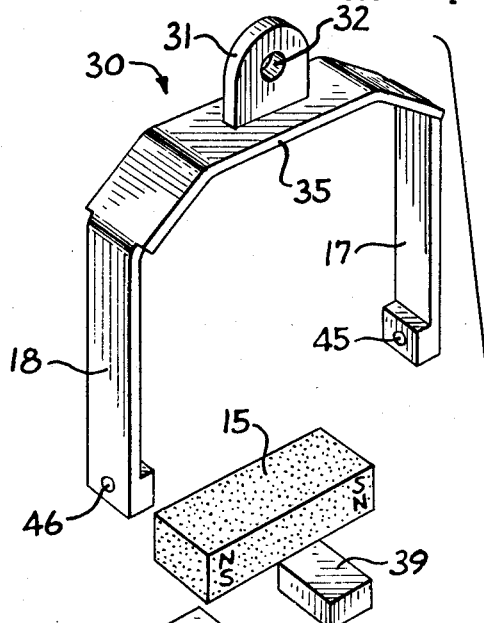
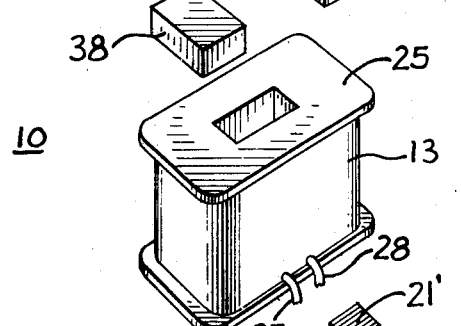
Fig. 2
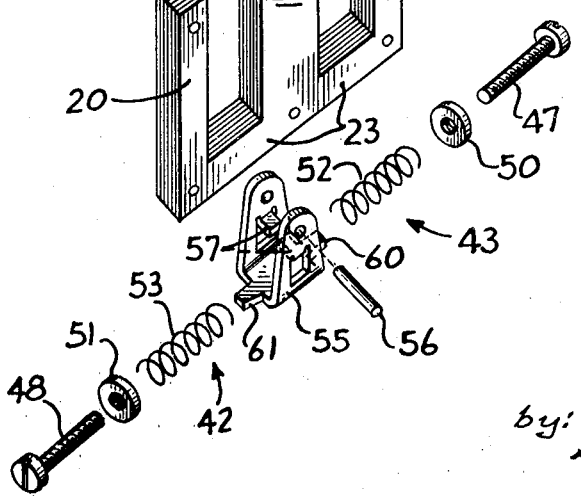
INVENTOR
AHMET K. BEY
by: Hofgren, Wegner, Allen,
Stellman and McCord
ATTYS.

United States Patent Office 3,500,080
Patented Mar. 10, 1970

3,500,080
OSCILLATING ELECTRIC MOTOR
Ahmet K. Bey, Chicago, Ill., assignor of one-half to Frances Budreck
Filed Sept. 18, 1967, Ser. No. 668,326
Int. Cl. H02k *33/00, 35/00*
U.S. Cl. 310—29                        6 Claims

ABSTRACT OF THE DISCLOSURE

An alternating magnetic flux field is induced in a magnetizable stator structure by a winding coupled to a source of AC energy. A permanent magnet forms a part of a vibrator rotor which oscillates about a pivot in response to the alternating magnetic flux field. The rotor includes a pair of magnetizable elements which surround the stator member to improve the magnetic flux path of the motor in order to produce a cooler operating motor.

---

This invention relates to a rotor, and more particularly to a vibratory motor having improved structure for the magnetic flux path of the motor.

Vibratory motors of the type disclosed in the present application are adapted for motivating many devices which require either an oscillating or a unidirectional output motion. For example, the vibratory motor may be employed in electric shavers, hair clippers, automatic toothbrushes, or any appliance requiring a low r.p.m., unidirectional driving torque, in which motor cost and motor size are factors of significance.

The present vibratory motor is an improvement on the vibratory motor disclosed in my copending patent application "Vibratory Motor," Ser. No. 641,509, filed May 26, 1967, to which reference should be made for a more complete disclosure. If it is desired to have unidirectional output torque, a clutch mechanism may be incorporated within the housing of the vibratory motor to convert the alternating input force of the vibrator rotor into a single direction output force. An example of such a clutch mechanism, which will convert the present vibratory motor into a low r.p.m., high torque, unidirectional output motor, is shown in my copending application, entitled "Electric Motor," Ser. No. 511,760, filed Dec. 6, 1965, to which reference should be made for a more complete disclosure of such a clutch mechanism.

The present application concerns vibratory motors of the type disclosed in both of the above identified copending applications. However, in the present application, the vibrator rotor structure has been improved to reduce magnetic flux leakage in the motor, allowing the motor to run at a significantly cooler temperature. This improved rotor structure consists of a shaped magnetizable member which surrounds the stator structure of the motor.

One object of this invention is the provision of a vibratory motor with an improved path for the magnetic flux field of the motor.

One feature of this invention is the provision of a vibratory motor having a first magnetic field generating member with an additional magnetizable member extending therefrom adjacent a second magnetic field generating member. As the first magnetic field generating member moves away from the second magnetic field generating member, the extending member moves towards the second magnetic field generating member, in order to reduce flux leakage.

Another feature of this invention is the provision of a vibratory motor having a stationary laminated core about which is wound a magnetic coil. A pivoted arm with a permanent magnet attached thereto extends into an alternating magnetic field generated by the core, causing electromagnetic induced vibrations. An additional member extending from the pivoted arm surrounds the stationary laminated core, in order to reduce flux leakage and hence lower the operating temperature of the laminated core.

Further advantages and features of the invention will be apparent from the following description and from the drawing, in which:

FIG. 1 is a front view of a vibratory motor embodying the present invention; and FIG. 2 is an exploded perspective view of the motor of FIG. 1, illustrating the relationship of its various components.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

The illustrated vibratory motor 10 generally consists of a magnetizable core member 12 associated with an electric winding 13 which induces a continuously alternating polarity magnetic flux field therein. The alternating magnetic flux field of core member 12 interacts with a source 15 of unidirectional magnetic flux field, such as a permanent magnet, to cause relative oscillatory motion therebetween.

Vibratory motor 10 has an improved structure for reducing flux leakage, consisting of a pair of magnetizable elements 17 and 18 secured to permanent magnet 15 and extending adjacent the magnetizable core member 12. When the motor is energized, one or the other of elements 17 and 18, and core member 12, move relatively towards each other, as can be seen in FIG. 1, thereby reducing the air gap between the relatively movable portions of the motor in order to reduce flux leakage. Preferably, the magnetizable core member 12 and associated electric winding 13 form the stator of the vibratory motor, with the permanent magnet 15 and appended magnetizable elements 17 and 18 forming a part of the rotor vibrator or oscillator of the motor.

Considering now in detail the illustrated vibratory motor 10 shown in the drawings, magnetizable core 12 consists of an E-shaped laminations member fabricated from a plurality of thin plates of laminated ferro-magnetic steel, forming a fixed stator core. The E-shaped core has a pair of outer spaced apart legs 20 and 21 and a center leg 22. The upstanding end portions 20' and 22' of leg members 20 and 22, respectively, define an open well or air gap therebetween through which the alternating magnetic field of the rotor will pass. Similarly, the upstanding end portions 21' and 22' between leg members 21 and 22, respectively, define a second open well or air gap therebetween through which the alternating magnetic field of the rotor will pass. The opposite portions of the leg members 20, 21 and 22 form a connecting yoke 23 which completes the magnetic path for each of the pair of air gaps.

Electric winding 13 includes a spool 25 having a central opening through which the center leg 22 of the laminations member is disposed. An inner end or flange of the spool 25 rests against the connecting yoke 23, while an outer end or flange terminates at a level below the plane of end portions 20', 21' and 22' of the laminations member 12. An electric wire encircling spool 25, and hence center leg 22, is connectable through circuit wires 27 and 28 to a conventional source of AC energy for inducing an alternating polarity magnetic flux field in the laminations member 12 and across the pair of air gaps.

Oscillator 30 has an arm 31 extending upwardly therefrom, which includes an opening or axis defining means 32 which pivotally connects the oscillator to a stationary motor housing (not illustrated). The motor housing itself may take any of a variety of known forms. By way of example, the housing may take the form illustrated in my before identified copending application, Ser. No. 641,509, in which case arm 31 would extend beyond the pivot point 32 and connect with an output transition member for transmitting the oscillating or rocking movement of the arm about the pivot point to an electrical appliance. Alternatively, axis defining means 32 could be pivoted to a stationary housing having an output shaft journaled therein. A suitable clutch linkage may be provided between the journaled output shaft and some point on arm 31 remote from the pivot point, to translate the reciprocating motion of oscillator 30 into a continuous, unidirectional output motion, such as described in my before identified copending application, Ser. No. 511,760. In either event, it will be appreciated that axis defining means 32 is pivotally connected to some stationary motor structure, so that the reciprocation of oscillator 30 about the pivot can be translated to the appliance driven thereby.

A field reinforcing plate 35, of soft steel fabrication, is fixedly attached to arm 31. Source 15 of unidirectional magnetic flux field may consist of a permanent magnet cemented to plate 35, with the opposite north (N) and south (S) poles of the permanent magnet being arranged on a face which is parallel with the end plane of leg members 20, 21 and 22. The permanent magnet is magnetized radially to form a pair of opposite poles on each face of the permanent magnet. Each opposite pole on the face adjacent the core is associated with one of the pair of air gaps formed by the E-shaped laminations member 12. While the magnetic poles of the permanent magnet are shown in one disposition in the drawings, the poles may be reversed, the N and S designations in the drawings being but illustrative.

A pair of magnetizable pole pieces 38 and 39, of soft steel fabrication, are cemented to opposite poles of permanent magnet 15, and extend outwardly into the pair of air gaps between outer legs 20 and 21 and the center leg 22 of laminations core 12. The pole pieces 38 and 39 concentrate the magnetic flux field across the gaps, reducing losses in the magnetic flux path and increasing the efficiency of the motor.

When coil 13 is energized, the resulting alternating magnetic flux field established in the air gaps between legs 20 and 21 and center leg 22 interacts with the unidirectional magnetic flux field from permanent magnet 15 and its pole pieces 38 and 39, reciprocating pole piece 38 between positions adjacent the center leg 22 and outer leg 20, while at the same time reciprocating pole piece 39 between positions adjacent the outer leg 21 and center leg 22, respectively.

As seen best in FIG. 1, it will be observed that as, for example, pole piece 38 moves toward center leg 22, and pole piece 39 correspondingly moves toward outer leg 21, the length of the air gaps between pole pieces 38 and 39, relative to leg members 20 and 22 respectively, increases. This increase in the length of the air gap is believed to increase the flux leakage of the motor. Similarly, when the pairs of pole pieces 38 and 39 rotate in the opposite direction, the air gaps on the opposite sides of the pole pieces similarly increases in length.

The flux leakage of the motor is minimized by means of the improved rotor structure illustrated in the drawings. More particularly, the ends of plate 35 are extended perpendicularly to form a generally U-shaped member of soft steel fabrication. The two arms of the U-shaped member form magnetizable elements 17 and 18, respectively, while the bottom or transverse portion of the U-shaped member forms the field reinforcing plate 35 for the permanent magnet. Elements 17 and 18 extend parallel and adjacent the outer legs 20 and 21 of the stator laminations member. As pole piece 38, for example, moves away from leg 20, magnetizable element 18 correspondingly moves toward leg 20. Thus, as one portion of the rotor, namely pole piece 38, moves away from a particular portion of the stator structure, another part of the rotor structure, namely magnetizable element 18, moves toward the same stator structure, and it is believed this causes the magnetic flux path to be of uniform length, hence minimizing the flux leakage in the motor. In any event, by experiments carried out by the applicant, it has been discovered that the addition of magnetizable elements 17 and 18 which surround the stator structure substantially lowers the operating temperature of the laminations member 12 when winding 13 is connected to a source of alternating current, producing a much cooler operating motor. This cooling effect, as previously explained, is believed to be related to the decreased flux leakage resulting from the improved magnetic path of the illustrated motor.

The amplitude of the oscillations or vibrations of oscillator 30 are controlled by a pair of snubbers 42 and 43. More particularly, the ends of elements 17 and 18 have internally threaded wells 45 and 46, for reception of adjusting screws 47 and 48. The adjusting screws move a pair of internally threaded washers 50 and 51, to compress a pair of compression springs 52 and 53 which form the snubbers. The opposite ends of springs 52 and 53 each bear against some fixed portion of the stator structure, such as a U-shaped member 55 secured to connecting yoke 23 by a pin 56. Member 55 has a pair of inwardly extending ears 57 which bear against the bottom of connecting yoke 23 in order to rigidly secure member 55 to the fixed stator structure. A pair of outwardly extending ears 60 and 61 receive the end portions of springs 52 and 53.

It will be apparent that as adjusting screws 47 and 48 are rotated, the springs 52 and 53 are correspondingly contracted or expanded in order to control the amplitude of the oscillations of oscillator 30. While the snubbers 42 and 43 have been illustrated as bearing against U-shaped member 55, it will be appreciated that the snubbers may bear against any portion of the stator structure or the associated motor housing, and may take the form illustrated in either of my before identified copending applications.

I claim:
1. A vibratory motor, comprising:
 a first member including an electromagnet with a pair of magnetizable leg pieces extending therefrom, the ends of said magnetizable leg pieces having a gap therebetween, said electromagnet being connectable with a source of alternating current for generating an alternating polarity magnetic field which extends across said gap, a second member with a permanent magnet for generating a unidirectional polarity magnetic field located for interaction with said alternating polarity magnetic field to cause relatively oscillatory motion between said first and second members, said second member further including an element of magnetizable material extending adjacent one of said leg pieces of said first member so that as said permanent magnet relatively moves in a direction away from said one leg piece and towards the other leg piece, said magnetizable element relatively moves toward said one leg piece.
2. The vibratory motor of claim 1 wherein said second member includes a pole piece of magnetizable material extending from said permanent magnet into said gap between said electromagnet leg pieces, whereby said second member pole piece moves in a direction away from said one leg piece as said magnetizable element moves toward said one leg piece.
3. The vibratory motor of claim 2 including snubber means connected between said second member and a portion of said first member for controlling the amplitude of the relative oscillations therebetween.

4. A vibratory motor, comprising:

a relatively fixed laminations member having a center leg and a pair of side legs disposed on opposite sides of said center leg and defining a pair of gaps therebetween, a coil connectable with a source of alternating current for inducing a magnetic field of continuously alternating magnetic polarity in said laminations member and across said pair of gaps; a relatively rotatable member including a permanent magnet having a pair of opposed magnetic pole areas located adjacent the pair of gaps defined by said opposed legs and said center leg, means for reducing the operating temperature of said laminations member when said coil is connected to said alternating current source comprising a magnetizable member connected to said permanent magnet and having a pair of elements extending outwardly therefrom, each of said elements extending adjacent a different one of said opposed side legs; and means pivotally connecting said rotatable member to said fixed member for oscillatory motion of both said permanent magnet and said pair of magnetizable elements about a pivot point in response to the alternation of the magnetic field from said laminations member.

5. The vibratory motor of claim 4 wherein said relatively rotatable member includes a pair of elongated pole pieces of magnetizable material secured to said permanent magnet at the opposed pole areas and extending therefrom into the pair of gaps defined by said opposed side legs and said center leg.

6. The vibratory motor of claim 4 wherein said magnetizable member includes a transverse portion generally perpendicular to each of said magnetizable elements, said transverse portion forming a magnetic field reinforcing plate fixedly attached to the face of said permanent magnet which is opposite the face adjacent said gaps.

References Cited

UNITED STATES PATENTS

| | | | |
|---|---|---|---|
| 3,202,849 | 8/1965 | Neal | 310—37 |
| 3,302,045 | 1/1967 | Dotto | 310—37 |
| 3,351,789 | 11/1967 | Bertling | 310—37 |
| 3,349,262 | 10/1967 | Gibbons | 310—37 |
| 3,382,382 | 5/1968 | Dotto | 310—37 |

MILTON O. HIRSHFIELD, Primary Examiner

D. F. DUGGAN, Assistant Examiner

U.S. Cl. X.R.

310—36